(12) United States Patent
Cha

(10) Patent No.: US 7,446,432 B2
(45) Date of Patent: Nov. 4, 2008

(54) ELECTRONIC DEVICE HAVING PATH OF POWER SUPPLIED TO DISPLAY PART SWITCHED ACCORDING TO WHETHER EXTERNAL POWER IS SUPPLIED

(75) Inventor: Jae-deok Cha, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 170 days.

(21) Appl. No.: 11/375,200

(22) Filed: Mar. 15, 2006

(65) Prior Publication Data

US 2006/0232133 A1 Oct. 19, 2006

(30) Foreign Application Priority Data

Apr. 15, 2005 (KR) .................. 10-2005-0031626

(51) Int. Cl.
*H02J 9/00* (2006.01)
*H02J 3/00* (2006.01)

(52) U.S. Cl. .......................................... 307/64; 307/82

(58) Field of Classification Search ............. 307/64–65, 307/82

See application file for complete search history.

(56) References Cited

U.S. PATENT DOCUMENTS

| | | | |
|---|---|---|---|
| 5,493,685 A | 2/1996 | Zenda | |
| 6,628,011 B2 * | 9/2003 | Droppo et al. | 307/43 |
| 6,881,509 B2 * | 4/2005 | Jungreis | 429/23 |
| 7,015,599 B2 * | 3/2006 | Gull et al. | 307/85 |
| 2002/0023235 A1 | 2/2002 | Odaohhara | |
| 2005/0168073 A1 * | 8/2005 | Hjort | 307/65 |

FOREIGN PATENT DOCUMENTS

| | | |
|---|---|---|
| CN | 2652012 Y | 10/2004 |
| JP | 07/141075 | 6/1995 |
| JP | 2002-062952 | 2/2002 |
| KR | 1995-20028 | 7/1995 |

(Continued)

OTHER PUBLICATIONS

Office Action issued in Korean Patent Application No. 2005-31626 on Apr. 26, 2006.

(Continued)

*Primary Examiner*—Michael J Sherry
*Assistant Examiner*—Michael Rutland Wallis
(74) *Attorney, Agent, or Firm*—Stein, McEwen & Bui, LLP

(57) ABSTRACT

An electronic device operable from one of an external power supply and a battery. The electronic device includes a display part, a power converter, an inverter generating an operating voltage for the display part, a system part generating information to be displayed on the display part and operable from an output of the power converter, a battery, an input power detector, and a switching controller. The switching controller controls power to the inverter so that where the input power detector detects availability of an external power, the switching controller supplies the external power to the power converter and the power converter supplies power to the inverter to generate the operating voltage for the display part; and where the input power detector detects the external power is not available, the switching system supplies battery power to the power converter and the inverter independently.

22 Claims, 5 Drawing Sheets

FOREIGN PATENT DOCUMENTS

| | | |
|---|---|---|
| KR | 2002-7910 A | 1/2002 |
| KR | 2003-9661 A | 2/2003 |
| KR | 2003-18855 A | 3/2003 |
| KR | 2003-48673 | 6/2003 |
| KR | 2004-13609 | 2/2004 |
| KR | 2005-32802 | 4/2005 |

OTHER PUBLICATIONS

Office Action issued in Chinese Patent Application No. 200610073644.9 on Jun. 8, 2007.

* cited by examiner

ELECTRONIC DEVICE HAVING PATH OF POWER SUPPLIED TO DISPLAY PART SWITCHED ACCORDING TO WHETHER EXTERNAL POWER IS SUPPLIED

CROSS-REFERENCE TO RELATED APPLICATIONS

This application claims the benefit of Korean Patent Application No. 2005-31626, filed Apr. 15, 2005, in the Korean Intellectual Property Office, the disclosure of which is incorporated herein by reference.

BACKGROUND OF THE INVENTION

1. Field of the Invention

An aspect of the present invention relates to an electronic device, and more particularly, to an electronic device wherein a path of power supplied to display is switched according to whether external power is supplied.

2. Description of the Related Art

Electronic devices employing batteries are widely used to enable portability and mobility. Such electronic devices include portable computers like laptop computers, notebook computers, personal digital assistants (PDA); mobile phones; CD players; video camcorders; etc. Generally, the electronic devices are provided with a connection terminal for connecting an adapter to use external power through an AC/DC adapter, as well as a battery. A secondary battery which is rechargeable is employed in the electronic devices and is recharged by power from the adapter.

The electronic devices may be provided with a display panel to display an image thereon, and a liquid crystal display (LCD) panel is widely used as the display panel.

The LCD panel is a light-receiving display panel unlike a cathode ray tube (CRT) or a plasma display panel (PDP), and includes a lamp to provide light.

FIG. 1 illustrates an example of a power supply system of a conventional portable computer. As shown in FIG. 1, the portable computer includes an adapter 110 and a battery 111 to supply power; a battery charger 112 to charge the battery 111 by using power from the adapter 110; an adapter detector 113 to detect whether the adapter 110 is connected; an LCD panel 116; a lamp 115 to emit light to the LCD panel 116; an inverter 114 to receive power from the adapter 110 or the battery 111 and convert the power into alternating current power for driving the lamp 115; and a system power supply 120a to convert the power from the adapter 110 or the battery 111 into power for driving a system part 117.

The power from the adapter 110 or the battery 111 is supplied to the system power supply 120a and the inverter 114 according to switching movement of a VDC switch 118 in response to the detection of the adapter detector 113. The adapter detector 113 and the VDC switch 118 control the power supplied from the adapter 110 to be supplied to the system power supply 120a and/or the inverter 114, prior to the power supplied from the battery 111.

The system power supply 120a converts the power supplied from the adapter 110 or the battery 111 into power for driving the system part 117 to supply the converted power to each of electronic components of the system part 117. The system power supply 120a includes DC/DC converters 121a and 122a, e.g., a switching voltage regulator, to output power at different voltage levels. An inverter switch 137 is provided to cut off power supplied to the inverter 114.

In the power supply system shown in FIG. 1, a voltage level of the power input to the inverter 114 ranges from a voltage level of power output from the adapter 110 to a voltage level output by the battery 111. For example, if the voltage level of output power of the battery 111 is 9V to 11.1 V (for a 3S battery) and the voltage level of the output power of the adapter 110 is 19V, the voltage level of the input power of the inverter 114 ranges from 9V to 19V.

The inverter 114 is designed to have a breakdown voltage corresponding to 19V to satisfy the input voltage of 9V to 19V and duty fluctuation becomes large, thereby preventing a realization of high efficiency in selecting a MOSFET as a switching element and in designing a high voltage transformer.

FIG. 2 illustrates another example of a power supply system of another conventional portable computer. Unlike the power supply system of the portable computer shown in FIG. 1, the power supply of the portable computer shown in FIG. 2 supplies the inverter 114 with power from one of DC/DC converters 121b and 122b of a system power supply 120b, thereby maintaining a voltage level of power input to the inverter 114, for example, at 5V.

However, while the battery 111 supplies power, in the power supply system of the portable computer shown in FIG. 2, the power from the battery 111 is input to the inverter 114 through the DC/DC converter 122b of the system power supply 120b and goes through a power conversion process twice, thereby lowering conversion efficiency of the DC/DC converter 122b and the inverter 114 corresponding to load in view of the battery 111, and thus losing electric power unnecessarily. That is, the conversion efficiency of the DC/DC converter 122b and the inverter 114 should be more than 95%, respectively, to maintain the conversion efficiency of the load of more than 90% with respect to the input to the battery 111. However, it is difficult to realize the DC/DC converter 122b and the inverter 114 with more than the 95% conversion efficiency.

SUMMARY OF THE INVENTION

Accordingly, an aspect of the present invention is to provide an electronic device which selectively supplies power output from a system power converter and a battery to a display power converter to realize a narrow input voltage range of input power to the display power converter depending on whether external power is supplied, and increases a usage time of the battery by improving design efficiency of the display power converter.

The foregoing and/or other aspects of the present invention are achieved by providing an electronic device which receives power from one of an external power supply and a battery outputting first power to drive the electronic device. The electronic device includes a display part; a system power converter to convert the external power supplied from the external power supply into second power at a preset voltage level; a display power converter to convert one of the first power and the second power into power for driving the display part and supply it to the display part; and a power controller to supply the second power from the system power converter as input power of the display power converter if detected that the external power is supplied from the external power supply, and supply the first power from the battery as the input power of the display power converter if the external power is cut off from the external power supply.

According to an aspect of the present invention, the electronic device may include a system part to display an image through the display part, wherein the system power converter receives the first power if the external power is cut off from the external power supply to convert it into the second power, and the second power output from the system power converter is supplied as power for driving the system part.

According to an aspect of the present invention, the display part may include a light-receiving display panel to display an image thereon and a lamp to emit light to the display panel to display the image on the display panel, wherein the display power converter comprises an inverter to convert the first power or the second power into alternating current power for driving the lamp, and supply the alternating current power to the lamp.

According to an aspect of the present invention, the display panel may include a liquid crystal display (LCD) panel.

According to an aspect of the present invention, the power controller may include a power switch which is switched to supply one of the first power and the second power to the inverter; and a switching controller to control the switch corresponding to the supply of the external power.

According to an aspect of the present invention, the power switch may include a first switch to control the first power to be supplied to the inverter and a second switch to control the second power to be supplied to the inverter.

According to an aspect of the present invention, the second switch may include a switching element to control the second power to be supplied to the inverter and a diode which is connected in parallel with the switching element to cut off power from the inverter to the system power converter.

According to an aspect of the present invention, the second power is included in the range of the voltage level of the first power.

According to an aspect of the present invention, the first power from the battery which is supplied as the input power of the display power converter does not pass through the system power converter in the state where the supply of the external power is cut off from the external power supply.

The foregoing and/or other aspects of the present invention are achieved by providing an electronic device which receives power from one of an external power supply and a battery outputting first power. The electronic device includes a display part; a system part to display an image through the display part; a plurality of system power converters to convert one of the external power supplied from the external power supply and the first power into a second power at different voltage levels for driving the system part; a display power converter to convert one of the second power output from one of the plurality of system power converters and the first power into a power for driving the display part, and supply the converted power to the display part; and a power controller to supply the second power from one of the plurality of system power converters as an input power of the display power converter if detected that the external power is supplied from the external power supply, and supply the first power from the battery as the input power of the display power converter if the external power is cut off from the external power supply.

According to an aspect of the present invention, a voltage level of the second power supplied to the display power converter is close to a voltage level of the first power.

According to an aspect of the present invention, the power controller may include a power switch which is switched to supply one of the first power and the second power to the inverter; and a switching controller to control the switch corresponding to the supply of the external power.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
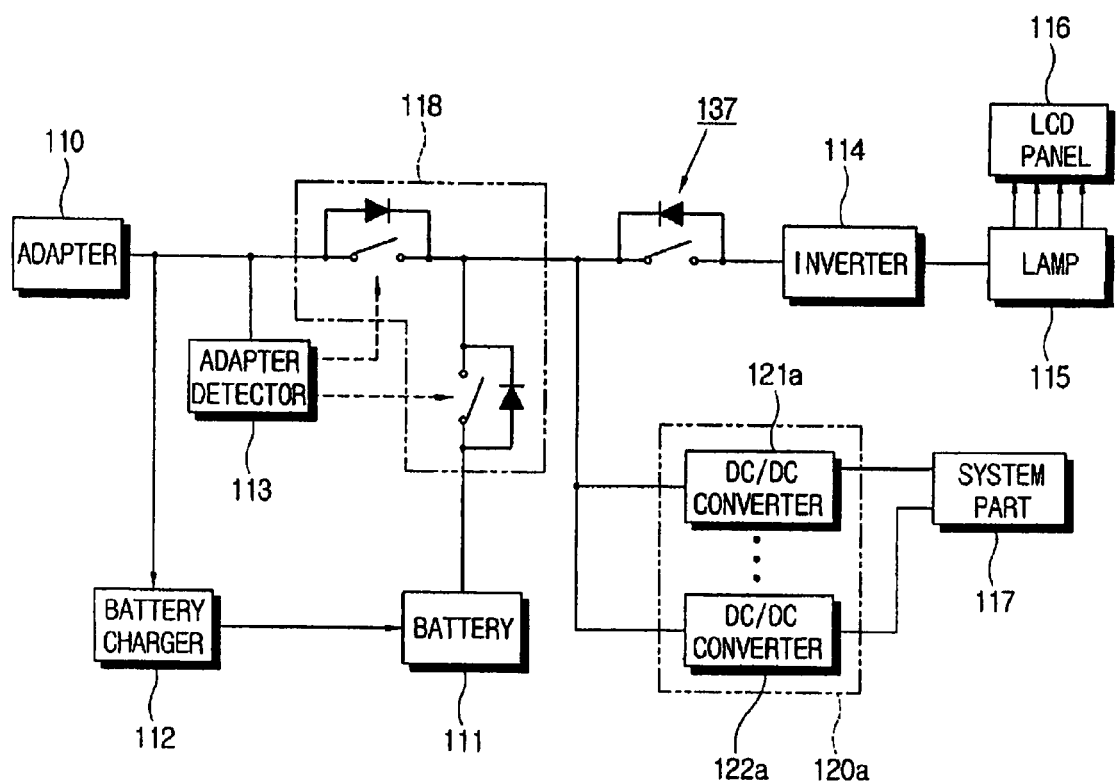
FIGS. 1 and 2 illustrate a power supply system of a conventional electronic device.
Figure 2:
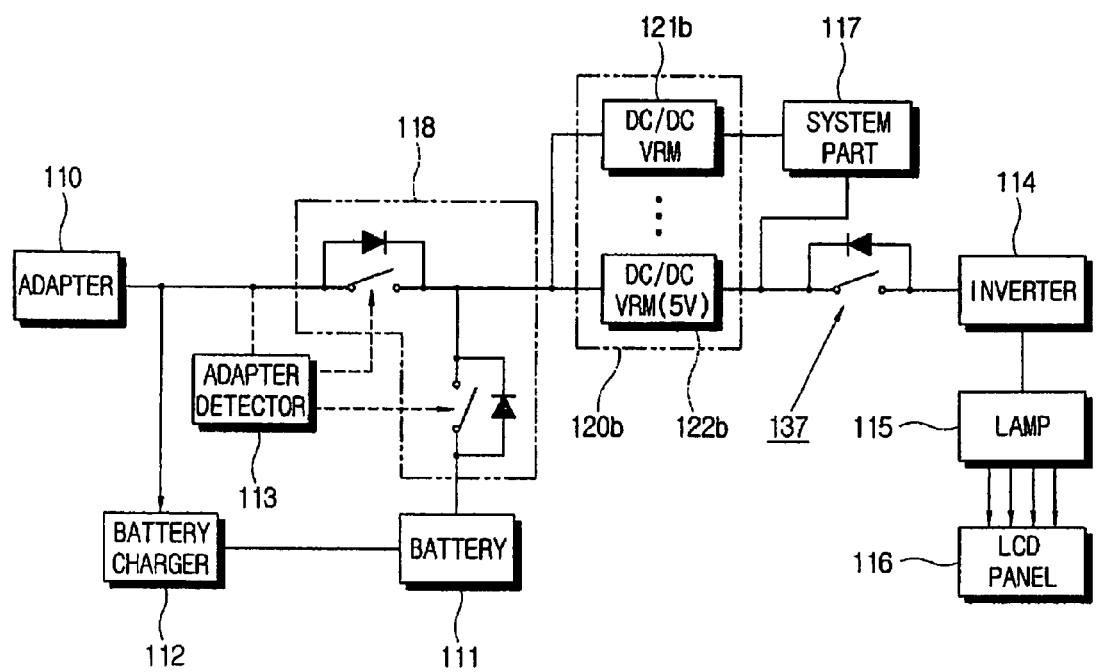

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
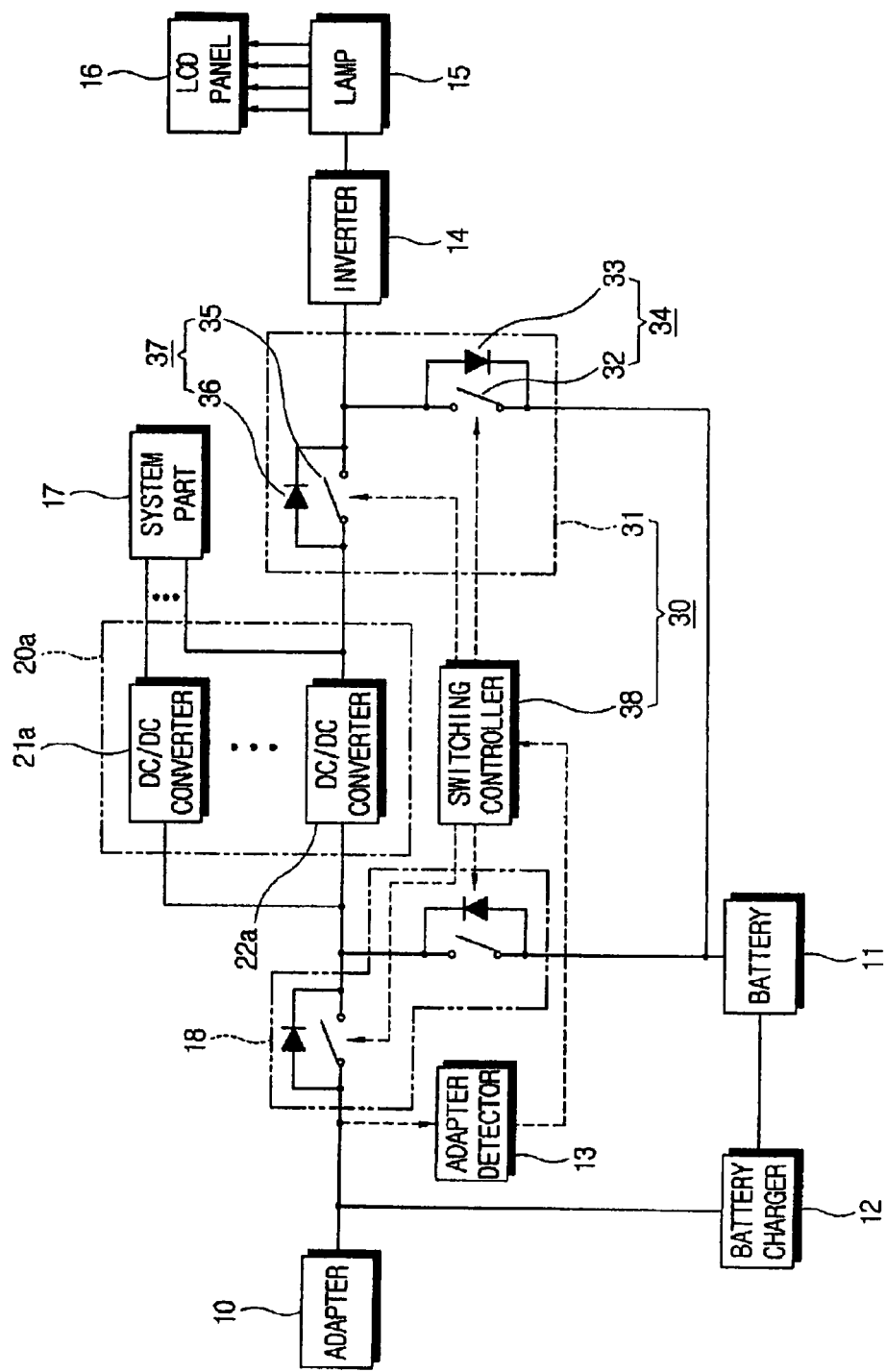
FIG. 3 is a control block diagram of an electronic device according to a first embodiment of the present invention.

An electronic device according to a first embodiment of the present invention receives power from one of an external power supply and a battery to drive the electronic device. That is, the electronic device may receive power from the external power supply or the battery. As shown in FIG. 3, the electronic device according to the first embodiment includes display parts 15 (lamp) and 16 (LCD panel), a battery 11, a system power supply 20a, and a power controller 30. The electronic device may also include an external power supply (hereinafter, to be referred to as an adapter) such as an adapter 10, etc., to supply external power.

A system part 17 includes a plurality of electronic components to perform major functions of the electronic device. For example, if the electronic device according to an embodiment of the present invention is provided as a portable computer, the system part 17 may include a CPU, a memory such as a RAM, etc., a chipset, a main board and a graphic card. Here, the system part 17 receives power from the system power supply 20a.

The battery may be provided as a secondary battery 11 which is rechargeable by a battery charger 12. For example, a lithium-ion battery or other rechargeable secondary battery may be used.

Here, the battery 11 includes at least one battery cell with a specification about a voltage level of a first power as a recharging and output power thereof. As an example of the first embodiment according to the present invention, the battery 11 may include three battery cells.

A maximum voltage level of power output from the respective battery cells is 3.7V, and a cut-off voltage of the respective battery cells is 3V as an example. Accordingly, the voltage level of the first power output from the battery 11 having the three battery cells is 9V to 11.1V.

The adapter 10 may include an AC/DC adapter to convert commercial alternating current power used at home, etc., into direct current power. Alternatively, the adapter 10 may be a DC/DC adapter to use direct current power, such as that which is available from a cigarette lighter jack in vehicles, as input power. The electronic device according to the first embodiment of the present invention receives the external power from the adapter 10, and a voltage level of the external power supplied from the adapter 10 is 19V as an example.

The system power supply 20*a* converts the external power supplied from the adapter 10 when the adapter 10 is connected or converts a first power supplied from the battery 11 into power at various voltage levels for driving the system part 17, and supplies the converted power to the system part 17. For example, if the electronic device is provided as a portable computer, the system power supply 20*a* outputs power at voltage levels, e.g., 5V, 3.3V, 2.5V, etc., for driving the respective electronic components of the system part 17. The power at various voltage levels which is output from the system power supply 20*a* is used for driving the respective electronic components and transmitting a signal, as necessary.

The system power supply 20*a* may include a plurality of system power converters, e.g., DC/DC converters 21*a* and 22*a*, each including, for example a switching voltage regulator to generate power at a specified voltage level. Hereinafter, the system power converters will be described as the DC/DC converters 21*a* and 22*a* as an example.

The display parts 15 and 16 may include a light-receiving display panel to display an image thereon; and a lamp 15 to emit light to the display panel 16 to display the image on the display panel 16. The light-receiving display panel will be described as an LCD panel 16 as an example, as shown in FIG. 3. Further, the LCD panel 16 may comprise a light-receiving display panel which displays the image by receiving light from the lamp 15.

The display power converter supplies power to the display part 15 and 16. Here, the display power converter includes an inverter 14 to supply alternating current power for driving the lamp 15, as an example.

The inverter 14 receives either the first power from the battery 11 or second power supplied from one (hereinafter, referred to as an inverter DC/DC converter 22*a*) of the plurality of DC/DC converters 21*a* and 22*a* of the system power supply 20*a* to convert the received power into power for driving the lamp 15, and supplies the converted power to the lamp 15.

The inverter DC/DC converter 22*a* converts the external power supplied from the adapter 10 when the adapter 10 connected, or the first power supplied from the battery 11 when the adapter 10 is not connected, into the second power at a preset voltage level to supply the second power to the system part 17 and to the inverter 14.

If the external power is supplied, the power controller 30 controls the second power output from the inverter DC/DC converter 22*a* to be supplied to the inverter 14. If the power from the adapter 10 is cut off, for example, if a user disconnects the adapter 10 or a usage power connected with the adapter 10, the power controller 30 controls the first power output from the battery 11 to be supplied to the inverter 14. Accordingly, if the external power is input from the adapter 10, the external power is converted into the second power by the inverter DC/DC converter 22*a* to be supplied to the lamp 15 for driving the lamp 15. If the external power is not input, the first power output from the battery 11 is directly applied to the inverter 14, thereby reducing power loss by unnecessary conversion by the inverter DC/DC converter 22*a* and increasing usage time of the battery 11.

The electronic device shown in FIG. 3 may comprise an adapter detector 13 to detect whether the external power is supplied from the adapter 10. The power controller 30 may determine the supply of the external power corresponding to the detection of the adapter detector 13. The power controller 30 may comprise a power switch 31 and a switching controller 38.

The power switch 31 switches one of the first power output from the battery 11 and the second power output from the inverter DC/DC converter 22*a* to the inverter 14, according to the control of the switching controller 38.

The power switch 31 may include a first switch 34 to control the first power output from the battery 11 to be supplied to the inverter 14; and a second switch 37 to control the second power output from the inverter DC/DC converter 22*a* to be supplied to the inverter 14. That is, the inverter 14 is supplied from the DC/DC converter 22*a* or directly from the battery 11.

The first switch 34 may include a first switching element 32 which is switched according to the control of the switching controller 38 to control the connection between the battery 11 and the inverter 14; and a first diode 33 which is connected in parallel with the first switching element 32. Here, a cathode of the first diode 33 is connected to the battery 11 and an anode of the first diode 33 is connected to the inverter 14. Accordingly, if the voltage level of the first power output from the battery 11 is larger than a voltage level of the second power output from the inverter DC/DC converter 22*a*, the first power from the battery 11 may be prevented from being supplied to the inverter 14 when the first switch 34 is turned off.

The second switch 37 may include a second switching element 35 which is switched according to the control of the switching controller 38 to control the connection between the inverter DC/DC converter 22*a* and the inverter 14; and a second diode 36 which is connected in parallel with the second switching element 35. An anode of the second diode 36 is connected to the inverter DC/DC converter 22*a* and a cathode thereof is connected to the inverter 14. Accordingly, when the first switching element 32 is turned on and the second switching element 35 is turned off by the control of the switching controller 38 to supply the first power from the battery 11 to the inverter 14, the first power at the larger voltage level than the second power is prevented from flowing to the inverter DC/DC converter 22*a*.

The switching controller 38 turns on and off the first switching element 32 and/or the second switching element 35 according to the detection of the adapter detector 13. That is, the switching controller 38 turns off the first switching element 32 and turns on the second switching element 35 if the adapter detector 13 detects that the external power is supplied from the adapter 10.

Meanwhile, the switching controller 38 turns off the second switching element 35 and turns on the first switching element 32 if the adapter detector 13 detects that the external power is not supplied from the adapter 10.

The voltage level of the second power output from the inverter DC/DC converter 22*a* may be close to the voltage level of the first power output from the battery 11. As described above, if the voltage levels of the power output from the respective DC/DC converters 21 a and 22*a* of the system power supply 20*a* are +5V, +3.3V and +2.5V and the voltage level of the first power output from the battery 11 is in the range of 9V to 11.1V, the DC/DC converter 22*a* outputting a power of 5V among the DC/DC converters 21*a* and 22*a* of the system power supply 20*a* may be used as the inverter DC/DC converter 22*a*. Also, if one of the DC/DC converters 21*a* and 22*a* of the system power supply 20*a* outputs power at the voltage level included in the range of 9V to 11.1V which is the same as the voltage level of the first power output from the battery 11, the corresponding DC/DC converters 21*a* and 22*a* may be used as the inverter DC/DC converter 22*a*. Then, the voltage level of the input power to the inverter 14 (INV_VDC) becomes 9V to 11.1V, thereby reducing a design margin of the inverter 14. That is, a narrow INV_VCD may be realized with respect to an input of the inverter 14, so that the inverter 14 can use a low breakdown voltage by the realization of the narrow INV_VDC, thereby reducing switching loss and conduction loss and ultimately increasing usage time of the battery 11. Thus, the voltage output from the DC/DC converter 22a may be within about 20% of the voltage output by the battery 11.

Figure 5:
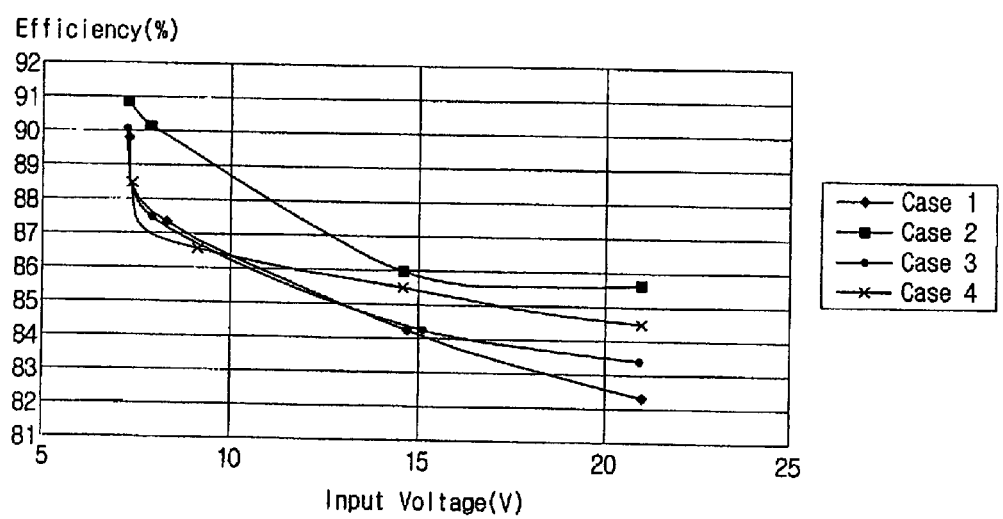
FIG. 5 illustrates the relation between a voltage level of input power of an inverter and efficiency of the inverter.

FIG. 5 illustrates the relation between the voltage level of the input power of the inverter 14 and efficiency of the inverter 14. As shown in FIG. 5, the lower the voltage level of the input power and the narrower the fluctuation of the voltage level of the input power is, the higher the efficiency of the inverter 14 is. Accordingly, if the narrow INV_VDC is realized with respect to the input of the inverter 14, the battery 11 is used longer due to efficiency improvement of the inverter 14. Cases 1-4, as shown, represent results of testing four samples subjected to a same testing condition.

In the embodiment shown in FIG. 3, a VDC switch 18 makes one of the external power from the adapter 10 and the first power from the battery 11 to be supplied to the system power supply 20a and/or the DC/DC converters 21a and 22a. That is, the switch 18 supplies the external power from the adapter 10 or the first power from the battery 11 to the system power supply 20a and/or the DC/DC converters 21a and 22a. The VDC switch 18 may switch according to the control of the switching controller 38. The switching controller 38 controls the VDC switch 18 to supply the external power from the adapter 10 to the system power supply 20a and/or the DC/DC converters 21a and 22a, prior to the power from the battery 11.

An electronic device according to a second embodiment of the present invention will be described with reference to FIG. 4.

Figure 4:
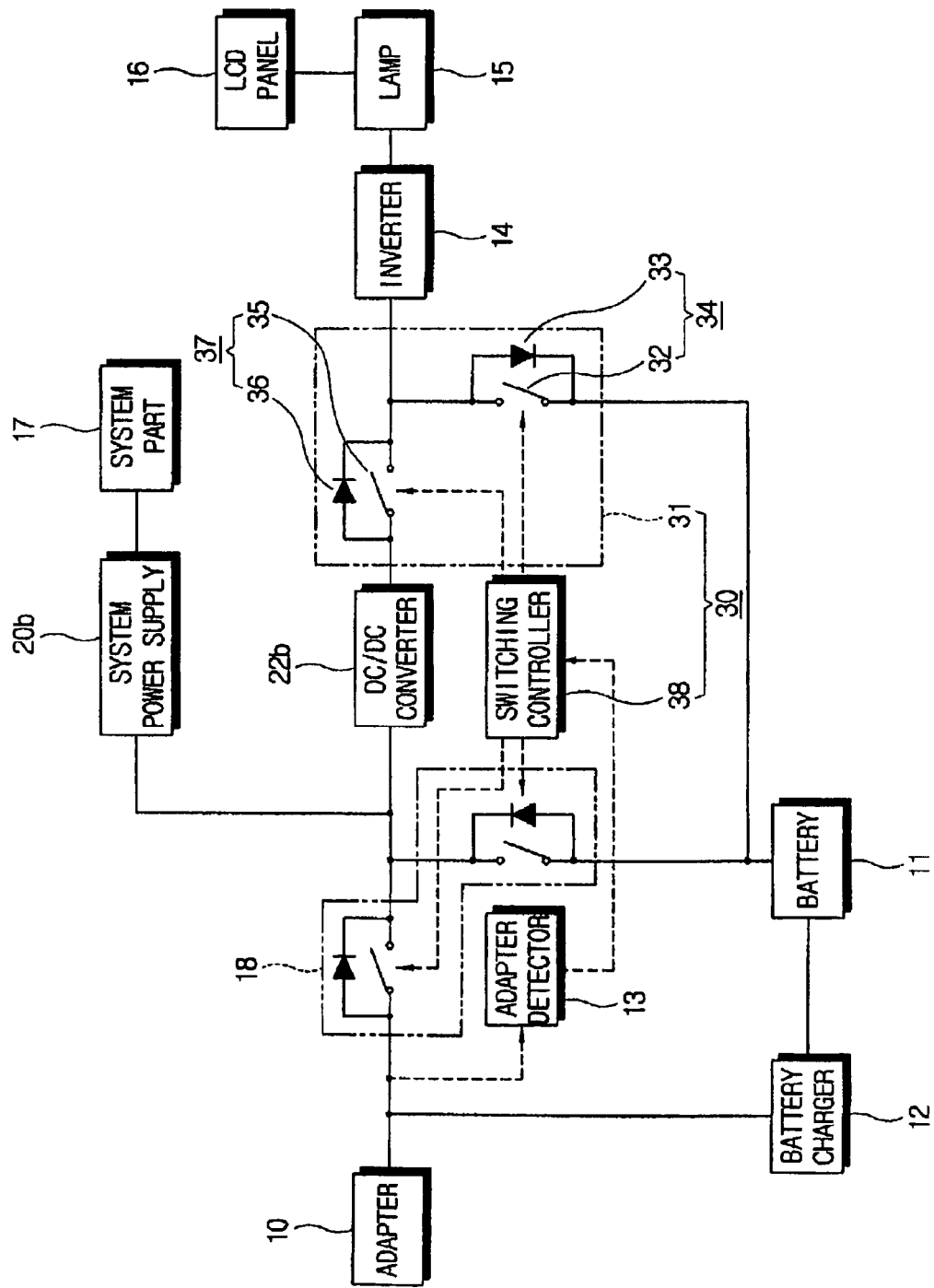
FIG. 4 is a control block diagram of an electronic device according to a second embodiment of the present invention.

The electronic device shown in FIG. 4 includes a display power converter, for example, a DC/DC converter 22b, which converts external power from an adapter 10 into second power at a preset voltage level to supply it to an inverter 14, and a system power supply 20b. As shown in FIG. 4, the DC/DC converter 22b receives first power outputted from a battery 11 when power from the adapter 10 is cut off. Even if a user disconnects the adapter 10 while using the electronic device in the state that the electronic device is connected with the adapter 10, the inverter 14 is continuously supplied with power by the first power outputted from the battery 11 until the power inputted to the inverter 14 is converted from the second power to the first power according to a switching movement of a power switch 31 of a power controller 30.

Like in the first embodiment shown in FIG. 3, the power controller 30 controls the second power output from the DC/DC converter 22b to be supplied to the inverter 14 if the supply of the external power is detected. Conversely, if the supply of the external power is not detected, the power controller 30 controls the first power output from the battery 11 to be supplied to the inverter 14.

A voltage level of the second power output from the DC/DC converter 22b according to the second embodiment of the present invention may be close to a voltage level of the first power output from the battery 11. The voltage level of the second power output from the DC/DC converter 22b may be included in the range of the voltage level of the first power output from the battery 11. As described above and as can be seen from FIG. 5, if the voltage level of the first power output from the battery 11 is in the range of 9V to 11.1V, the voltage level of the second power output from the DC/DC converter 22b may be included in the range of 9V to 11.1V, for example, 10V. Then, the voltage level of the input power to the inverter 14 becomes 9V to 11.1V, thereby reducing a design margin of the inverter 14. That is, a narrow INV_VDC may be realized with respect to an input of the inverter 14, thereby reducing switching loss and ultimately increasing usage time of the battery 11 due to the realization of the narrow INV_VDC.

Where electronic components of the system part 17 include an electronic component which uses a power corresponding to the voltage level of the second power, the second power output from the DC/DC converter 22b may also supply power to the corresponding electronic component.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electronic device operable from an external power supplied from an adapter or a first power supplied from a battery, the electronic device comprising:
    a display part;
    a power converter arranged to convert the external power from the adapter into a second power having a preset voltage level;
    a display power converter arranged to convert the first power from the battery or the second power from the power converter into a power for driving the display part, and supply the power for driving the display part to the display part;
    a first power switch coupled to the adapter, the battery, and the power converter, and operable to selectively supply the external power from the adapter to the power converter, or the first power from the battery to the power converter;
    a second power switch coupled to the power converter, the battery, and the display power converter, and operable to selectively supply the first power from the battery to the display power converter, or the second power from the power converter to the display power converter; and
    a switch controller arranged to;
        control the first power switch to supply the external power from the adapter to the power converter when the external power is being supplied from the adapter, and supply the first power from the battery to the power converter when the external power is not being supplied from the adapter, and
        control the second power switch to supply the second power from the power converter to the display power converter when the external power is being supplied from the adapter, and supply the first power from the battery to the display power converter when the external power is not being supplied from the adapter.

2. The electronic device according to claim 1, further comprising:
    a system part to control a display of an images on the display part; and
    a system power supply coupled to the first power switch to convert the first power from the battery or the external power from the adapter into a power for driving the system part, and supply the power for driving the system part to the system part.

3. The electronic device according to claim 1, wherein:
    the display part comprises:
        a light-receiving display panel to display an image thereon, and
        a lamp to emit light to the display panel to illuminate the image displayed on the display panel,
    the external power is a direct current (DC) power obtained from alternating current (AC) power source or a direct current (DC) power source, and the display power converter is arranged to convert the first power from the battery or the second power from the power converter into an alternating current (AC) power for driving the lamp, and supply the alternating current (AC) power to the lamp.

4. The electronic device according to claim 3, wherein the display panel comprises a liquid crystal display (LCD) panel.

5. The electronic device according to claim 3, further comprising an adapter detector to detect whether the external power is being supplied from the adapter, and output a signal indicative of a result of the detection;
wherein the switch controller is arranged to control the first power switch and the second power switch in response to the signal output from the adapter detector.

6. The electronic device according to claim 1, wherein the second power switch comprises:
a first switch to supply the first power from the battery to the display power converter; and
a second switch to supply the second power from the power converter to the display power converter.

7. An electronic device operative from one of an adapter providing external power and a battery providing first power, the electronic device comprising:
a display part;
a power converter arranged to convert the external power supplied from the adapter into second power at a preset voltage level;
a display power converter arranged to convert one of the first power and the second power into power for driving the display part and supply the converted power to the display part;
a power switch disposed between the power converter and the display power converter, and operable to supply one of the first power directly from the battery and the second power from the power converter to the display power converter; and
a switch controller arranged to control the supply of the second power from the power converter as input power of the display power converter if the external power is supplied from the adapter, and to control the supply of the first power directly from the battery as the input power of the display power converter if the external power is cut off from the adapter;
wherein the power switch comprises:
a first switch to control the first power supplied from the battery to be supplied directly to the display power converter; and
a second switch to control the second power supplied from the power converter to be supplied to the display power converter; and
wherein the second switch comprises:
a switching element to control the second power to be supplied to the display power converter; and
a diode connected in parallel with the switching element to cut off power from the display power converter to the power converter.

8. The electronic device according to claim 1, wherein a voltage range of the second power from the power converter is included in a voltage range of the first power from the battery.

9. The electronic device according to claim 1, wherein the first power from the battery is supplied to the display power converter without passing through the power converter when the external power is not being supplied from the adapter.

10. An electronic device operable from an external power supplied from an adapter or a first power supplied from a battery, the electronic device comprising:
a display part;
a system part to control a display of an image on the display part;
a plurality of power converters arranged in parallel to convert the external power from the adapter or the first power from the battery into a plurality of second powers having different preset voltage levels for driving the system part, and supply the second powers to the system part;
a display power converter arranged to convert one of the second powers from one of the plurality of power converters or the first power from the battery into a power for driving the display part, and supply the power for driving the display part to the display part;
a first power switch coupled to the adapter, the battery, and the plurality of power converters, and operable to selectively supply the external power from the adapter to the plurality of power converters, or the first power from the battery to the plurality of power converters;
a second power switch coupled to the one of the plurality of power converters, the battery, and the display power converter, and operable to selectively supply the first power from the battery to the display power converter, or the one of the second powers from the one of the plurality of power converters to the display power converter; and
a switch controller arranged to:
control the first power switch to supply the external power from the adapter to the plurality of power converters when the external power is being supplied from the adapter, and supply the first power from the battery to the plurality of power converters when the external power is not being supplied from the adapter, and
control the second power switch to supply the one of the second powers from the one of the plurality of power converters to the display power converter when the external power is being supplied from the adapter, and supply the first power from the battery to the display power converter when the external power is not being supplied from the adapter.

11. The electronic device according to claim 10, wherein a voltage level of the one of the second powers from the one of the plurality of power converters is close to a voltage level of the first power from the battery.

12. The electronic device according to claim 10, wherein:
the display part comprises:
a light-receiving display panel to display an image thereon, and
a lamp to emit light to the display panel to illuminate the image displayed on the display panel, and
the display power converter is arranged to convert the first power from the battery or the one of the second powers from the one of the plurality of power converters into an alternating current (AC) power for driving the lamp, and supply the alternating current (AC) power to the lamp.

13. The electronic device according to claim 12, wherein the display panel comprises a liquid crystal display (LCD) panel.

14. The electronic device according to claim 12, further comprising an adapter detector to detect whether the external power is being supplied from the adapter, and output a signal indicative of a result of the detection;
wherein the switch controller is arranged to control the first power switch and the second power switch in response to the signal output from the adapter detector.

15. The electronic device according to claim 14, wherein the second power switch comprises:

a first switch arranged to supply the first power from the battery to the display power converter; and a second switch arranged to supply the one of the second powers from the one of the plurality of power converters to the display power converter.

16. An electronic device operative from one of an adapter supplying external power and a battery outputting first power, the electronic device comprising:

a display part;

a system part to display an image through the display part;

a plurality of power converters arranged in parallel, to convert one of the external power supplied from the adapter and the first power into a second power at different voltage levels for driving the system part;

a display power converter arranged to convert one of the second power output from one of the plurality of power converters and the first power into a power for driving the display part, and to supply the converted power to the display part;

a power switch disposed between the power converters and the display power converter, and operable to supply one of the first power directly from the battery and the second power from one of the plurality of power converters to the display power converter; and a switch controller arranged to control the supply of the second power from one of the plurality of power converters as an input power of the display power converter if the external power is supplied from the adapter, and to supply the first power directly from the battery as the input power of the display power converter if the external power is cut off from the adapter;

wherein the display part comprises a light-receiving display panel to display an image thereon and a lamp to emit light to the display panel to display the image on the display panel, wherein the display power converter is arranged to convert the first power or the second power into alternating current (AC) power for driving the lamp, and supply the alternating current (AC) power to the lamp;

wherein the switch controller is disposed to control operation of the power switch based on the supply of the external power from the adapter;

wherein the power switch comprises:
a first switch arranged to control the first power to be supplied directly from the battery to the display power converter; and
a second switch arranged to control the second power to be supplied from one of the power converters to the display power converter; and wherein the second switch comprises:
a switching element to control the second power to be supplied from one of the power converters to the display power converter; and
a diode connected in parallel with the switching element, to cut off power from the display power converter to the power converters.

17. The electronic device according to claim 10, wherein the first power from the battery is supplied to the display power converter without passing through any of the plurality of power converters when the external power is not being supplied from the adapter.

18. The electronic device according to claim 11, wherein a voltage level of the one of the second powers from the one of the plurality of power converters is within about 20 percent of a voltage level of the first power from the battery.

19. An electronic device, comprising:
an adapter to supply external power;
a battery to supply a battery power;
a display part;
a system part to generate information to be displayed on the display part, the system part being driven by the external power from the adapter or the battery power from the battery;
an input power detector to detect whether the external power is being supplied from the adapter, an output a signal indicative of a result of the detection;
a power converter arranged to convert the external power from the adapter or the battery power from the battery into a second power having a preset voltage level;
a display power converter arranged to convert the second power from the power converter or the battery power from the battery into an alternating current (AC) power for driving the display part;
a first power switch coupled to the adapter, the battery, the system part, and the power converter to selectively supply the external power from the adapter to the system part and the power converter, or the battery power from the battery to the system part and the power converter;
a second power switch coupled to the power converter, the battery, and the display power converter to selectively supply the second power from the power converter to the display power converter, or the battery power from the battery to the display power converter; and
a switch controller, responsive to the signal output from the input power detector, arranged to:
control the first power switch to supply the external power from the adapter to the system part and the power converter when the signal output from the input power detector indicates that the external power is being supplied from the adapter, and supply the battery power from the battery to the system part and the power converter when the signal output from the input power detector indicates that the external power is not being supplied from the adapter, and
control the second power switch to supply the second power from the power converter to the display power converter when the signal output from the input power detector indicates that the external power is being supplied from the adapter, and supply the battery power from the battery directly to the display power converter, thereby bypassing the power converter, when the signal output from the input power detector indicates that the external power is not being supplied from the adapter.

20. The electronic device of claim 19, wherein when the switch controller is controlling the first power switch to supply the external power from the adapter to the power converter and controlling the second power switch to supply the second power from the power converter to the display power converter and the signal output from the input power detector indicates a loss of the external power from the adapter, the switch controller controls the second power switch to supply the battery power from the battery directly to the display power converter so that the display power converter is continuously supplied with power.

21. The electronic device of claim 19, wherein the power converter supplies a power for driving the system part to the system part, the power for driving the system part being different from the second power supplied to the display power converter.

22. The electronic device of claim 19, wherein the second power from the display power converter, and the battery power from the battery have respective voltages that are equal to each other within about 20 percent.

* * * * *

UNITED STATES PATENT AND TRADEMARK OFFICE
CERTIFICATE OF CORRECTION

| | |
|---|---|
| PATENT NO. | : 7,446,432 B2 |
| APPLICATION NO. | : 11/375200 |
| DATED | : November 4, 2008 |
| INVENTOR(S) | : Jae-deok Cha |

It is certified that error appears in the above-identified patent and that said Letters Patent is hereby corrected as shown below:

Column 8, line 52, change "images" to --image--.

Column 8, line 66, insert --an-- after "from".

Column 11, line 65, insert --an-- after "supply".

Column 12, line 63, delete ",".

Signed and Sealed this

Sixth Day of January, 2009

JON W. DUDAS
*Director of the United States Patent and Trademark Office*